(12) United States Patent
Ohtachi et al.

(10) Patent No.: US 12,392,352 B2
(45) Date of Patent: Aug. 19, 2025

(54) VACUUM EXHAUST APPARATUS AND VACUUM PUMP USED THEREIN

(71) Applicant: Edwards Japan Limited, Yachiyo (JP)

(72) Inventors: Yoshinobu Ohtachi, Yachiyo (JP); Yasushi Maejima, Yachiyo (JP); Tsutomu Takaada, Yachiyo (JP)

(73) Assignee: Edwards Japan Limited, Yachiyo (JP)

( * ) Notice: Subject to any disclaimer, the term of this patent is extended or adjusted under 35 U.S.C. 154(b) by 490 days.

(21) Appl. No.: 17/779,116

(22) PCT Filed: Nov. 27, 2020

(86) PCT No.: PCT/JP2020/044377
§ 371 (c)(1),
(2) Date: May 23, 2022

(87) PCT Pub. No.: WO2021/112021
PCT Pub. Date: Jun. 10, 2021

(65) Prior Publication Data
US 2022/0397122 A1    Dec. 15, 2022

(30) Foreign Application Priority Data

Dec. 5, 2019 (JP) .................................. 2019-220773
Dec. 6, 2019 (JP) .................................. 2019-221310

(51) Int. Cl.
*F04D 27/00*    (2006.01)
*F04B 49/06*    (2006.01)
(Continued)

(52) U.S. Cl.
CPC ............ *F04D 27/007* (2013.01); *F04B 49/06* (2013.01); *F04B 49/225* (2013.01); *F04D 19/04* (2013.01)

(58) Field of Classification Search
CPC ...... F04D 19/04; F04D 19/046; F04D 19/042; F04D 19/048; F04D 15/0022;
(Continued)

(56) References Cited

U.S. PATENT DOCUMENTS 5,795,328 A * 8/1998 Barnitz ................ G05D 16/208
604/67
7,993,113 B2 * 8/2011 Namiki ................. F04D 29/601
417/423.4
(Continued)

FOREIGN PATENT DOCUMENTS

CN    106014999 A    10/2016
JP    2018204448 A    12/2018
(Continued)

OTHER PUBLICATIONS

Extended Search Report from counterpart European Application No. 20896061.7 dated Nov. 27, 2023, 8 pp.
(Continued)

*Primary Examiner* — Philip E Stimpert
(74) *Attorney, Agent, or Firm* — Shumaker & Sieffert, P.A.

(57) ABSTRACT

A vacuum exhaust apparatus capable of accurately and rapidly adjusting the pressure in an exhaust chamber and a vacuum pump used therein are provided. A vacuum pump includes a rotor that rotates to exhaust an exhaust chamber and a casing having an inlet port. A valve is located between the inlet port of the vacuum pump and an outlet port of the exhaust chamber. A controller performs control such that the pressure in the exhaust chamber matches a target value. The controller adjusts the opening degree of the valve when the absolute value of the difference between the pressure in the exhaust chamber and the target value is greater than a predetermined value, and adjusts the rotational speed of the rotor of the vacuum pump when the absolute value of the
(Continued)

difference between the pressure in the exhaust chamber and the target value is less than the predetermined value.

10 Claims, 8 Drawing Sheets

(51) Int. Cl.
*F04B 49/22* (2006.01)
*F04D 19/04* (2006.01)

(58) Field of Classification Search
CPC ............... F04D 15/0066; F04D 27/007; F04D 27/0207; F04D 27/0223
USPC .......................................... 417/423.1, 423.4
See application file for complete search history.

(56) References Cited

U.S. PATENT DOCUMENTS

| | | |
|---|---|---|
| 10,443,600 B2 | 10/2019 | Kozaki et al. |
| 2019/0107110 A1 | 4/2019 | Kozaki et al. |

FOREIGN PATENT DOCUMENTS

| | | | |
|---|---|---|---|
| JP | 201970924 A | 5/2019 | |
| JP | 2019070924 A | 5/2019 | |

OTHER PUBLICATIONS

International Search Report and Written Opinion of International Application No. PCT/JP2020/044377, dated Feb. 9, 2021, 10 pp.

\* cited by examiner

VACUUM EXHAUST APPARATUS AND VACUUM PUMP USED THEREIN

This application is a U.S. national phase application under 35 U.S.C. § 371 of international application number PCT/JP2020/044377 filed on Nov. 27, 2020, which claims the benefit of JP application number 2019-220773 filed on Dec. 5, 2019 and JP application number 2019-221310 filed on Dec. 6, 2019. The entire contents of each of international application number PCT/JP2020/044377, JP application number 2019-220773 and JP application number 2019-221310 are incorporated herein by reference.

TECHNICAL FIELD

The present disclosure relates to a vacuum exhaust apparatus for controlling the pressure in an exhaust chamber and a vacuum pump used therein.

BACKGROUND

An apparatus that manufactures semiconductors, liquid crystals, solar cells, light emitting diodes (LEDs), and the like (hereinafter referred to as "semiconductors and the like) has a vacuum chamber that is an exhaust chamber to be exhausted and into which process gas is introduced for processes, such as thin film formation and etching, on objects to be processed placed in the vacuum chamber.

For example, Japanese Patent Application Publication No. 2014-148703 discloses a technique to perform control to set the pressure in such a vacuum chamber to a desired pressure by vacuum exhausting the vacuum chamber while changing the opening degree of a valve connected to the outlet port of the vacuum chamber and the rotational speed of the rotor of a turbomolecular pump, which is a vacuum pump connected to the downstream side of the valve.

SUMMARY

However, with the above-mentioned vacuum exhaust technique, a change in the opening degree of the valve results in a relatively large change in the pressure in the vacuum chamber, whereas a change in the rotational speed of the rotor of the turbomolecular pump results in a relatively small change in the pressure in the vacuum chamber. Accordingly, it is difficult to set the pressure in the vacuum chamber to a desired pressure.

In view of the above, it is an objective of the present disclosure to provide a vacuum exhaust apparatus capable of accurately and rapidly adjusting the pressure in an exhaust chamber and a vacuum pump used therein.

In order to achieve the above objective, a vacuum exhaust apparatus according to the first aspect of the present disclosure includes:
- a vacuum pump including a rotor configured to rotate to exhaust an exhaust chamber, and a casing having an inlet port;
- a valve located between the inlet port of the vacuum pump and an outlet port of the exhaust chamber; and
- a controller configured to perform control such that a pressure in the exhaust chamber matches a target value, wherein
the controller is configured to control the pressure by adjusting an opening degree of the valve when an absolute value of a difference between the target value and the pressure is greater than a predetermined value, and by adjusting a rotational speed of the rotor when the absolute value of the difference is less than the predetermined value.

In the above vacuum exhaust apparatus, the controller may be configured to perform control such that the rotational speed of the rotor is constant when the absolute value of the difference is greater than the predetermined value, and that the opening degree of the valve is constant when the absolute value of the difference is less than the predetermined value.

In the above vacuum exhaust apparatus, the controller may be configured to increase a gain of a transfer function $G_V$ represented by equation (1):

$$G_V = O_V/\delta_P \quad (1)$$

when the absolute value of the difference is greater than the predetermined value, and increase a gain of a transfer function $G_M$ represented by equation (2):

$$G_M = \Omega_M/\delta_P \quad (2)$$

when the absolute value of the difference is less than the predetermined value,
in equation (1), $O_V$ is a Laplace transform where an initial value of the opening degree of the valve is 0, in equation (2), $\Omega_M$ is a Laplace transform where an initial value of the rotational speed of the rotor is 0, and in equations (1) and (2), $\delta_P$ is a Laplace transform where an initial value of the difference is 0.

In the above vacuum exhaust apparatus, the controller may be configured to reduce the gain of the transfer function $G_M$ when the absolute value of the difference is greater than the predetermined value, and reduce the gain of the transfer function $G_V$ when the absolute value of the difference is less than the predetermined value.

In the above vacuum exhaust apparatus,
the vacuum pump may include a magnetic bearing configured to levitate and support the rotor, and
the controller may be configured to change the opening degree of the valve when the rotational speed of the rotor matches a natural frequency of displacement of the rotor or an absolute value of a difference between the rotational speed and the natural frequency is less than or equal to a predetermined value while the pressure matches the target value, and control the rotational speed of the rotor such that the pressure matches the target value again.

In the above vacuum exhaust apparatus, the predetermined value may be changed while the rotor is rotated according to at least one of the opening degree of the valve and a type and an amount of gas that is introduced into the exhaust chamber and exhausted by the vacuum pump.

To achieve the above objective, a vacuum pump according to the second aspect of the present disclosure is a vacuum pump to be used in a vacuum exhaust apparatus including a valve and a controller configured to perform control such that a pressure in an exhaust chamber matches a target value, the vacuum pump including:
- a rotor configured to rotate to exhaust the exhaust chamber; and
- a casing having an inlet port that allows the valve to be located between the inlet port and an outlet port of the exhaust chamber,
wherein the controller is configured to control the pressure by adjusting an opening degree of the valve when an absolute value of a difference between the target value and the pressure is greater than a predetermined value, and by adjusting a rotational speed of the rotor when the absolute value of the difference is less than the predetermined value.

In the above vacuum pump, the controller may be configured to perform control such that the rotational speed of the rotor is constant when the absolute value of the difference is greater than the predetermined value, and that the opening degree of the valve is constant when the absolute value of the difference is less than the predetermined value.

In the above vacuum pump, the controller may be configured to increase a gain of a transfer function $G_V$ represented by equation (1):

$$G_V = O_V/\delta_P \quad (1)$$

when the absolute value of the difference is greater than the predetermined value, and increase a gain of a transfer function $G_M$ represented by equation (2):

$$G_M = \Omega_M/\delta_P \quad (2)$$

when the absolute value of the difference is less than the predetermined value, in equation (1), $O_V$ is a Laplace transform where an initial value of the opening degree of the valve is 0, in equation (2), $\Omega_M$ is a Laplace transform where an initial value of the rotational speed of the rotor is 0, and in equations (1) and (2), $\delta_P$ is a Laplace transform where an initial value of the difference is 0.

In the above vacuum pump, the controller may be configured to reduce the gain of the transfer function $G_V$ when the absolute value of the difference is greater than the predetermined value, and reduce the gain of the transfer function $G_M$ when the absolute value of the difference is less than the predetermined value.

The above vacuum pump may further include a magnetic bearing configured to levitate and support the rotor.

The controller may be configured to change the opening degree of the valve when the rotational speed of the rotor matches a natural frequency of displacement of the rotor or an absolute value of a difference between the rotational speed and the natural frequency is less than or equal to a predetermined value while the pressure matches the target value, and control the rotational speed of the rotor such that the pressure matches the target value again.

In the above vacuum pump, the predetermined value may be changed while the rotor is rotated according to at least one of the opening degree of the valve and a type and an amount of gas that is introduced into the exhaust chamber and exhausted by the vacuum pump.

According to the present disclosure, a vacuum exhaust apparatus capable of accurately and rapidly adjusting the pressure in an exhaust chamber and a vacuum pump used therein are provided.

DETAILED DESCRIPTION

Figure 1:
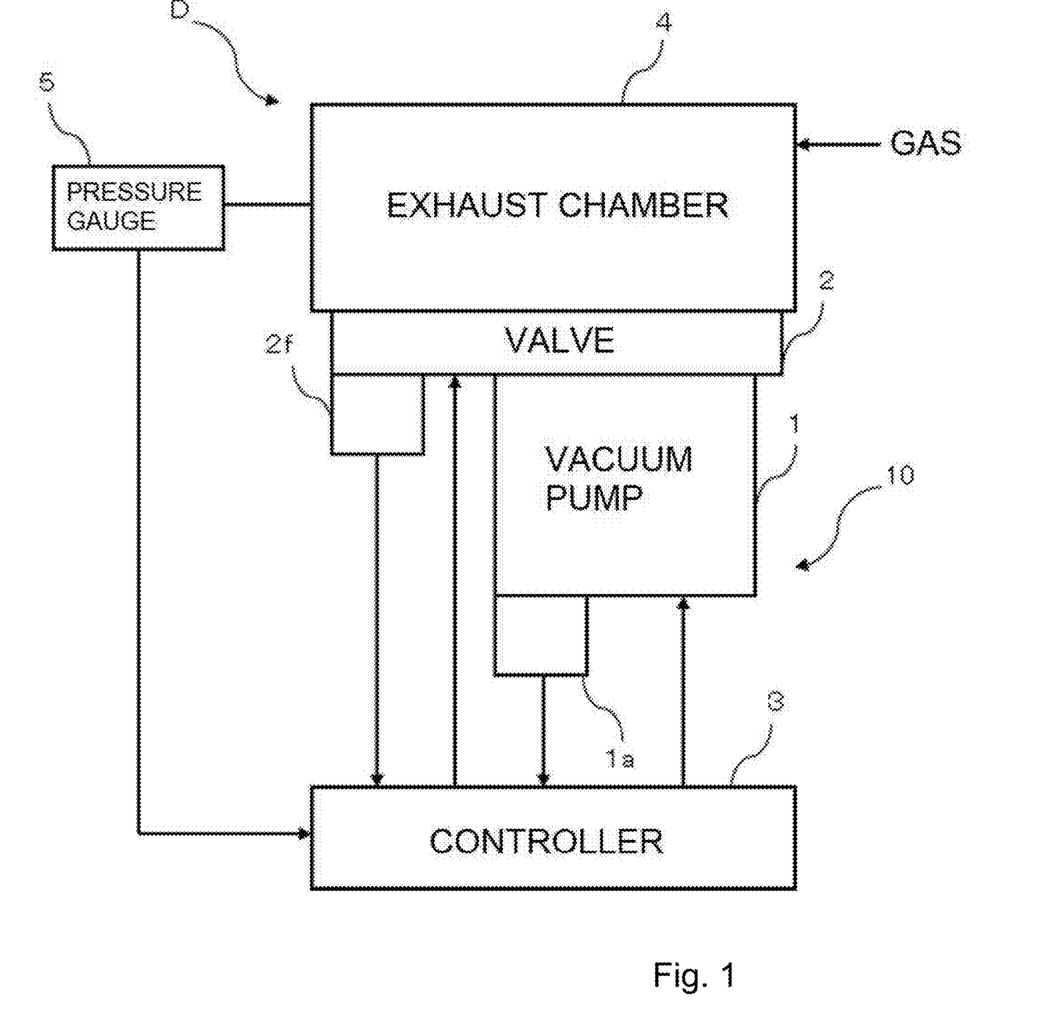
FIG. 1 is a schematic view showing the configuration of a vacuum apparatus including a vacuum exhaust apparatus according to an example of the present disclosure.

A vacuum exhaust apparatus according to an example of the present disclosure is now described with reference to the drawings. As shown in FIG. 1, a vacuum exhaust apparatus 10 is an apparatus included in a vacuum apparatus D used for processes, such as thin film forming process and etching process, in a semiconductor manufacturing apparatus, for example. The vacuum exhaust apparatus 10 vacuum exhausts an exhaust chamber to be exhausted (vacuum chamber) 4, in which objects to be processed are placed, so that the pressure in the exhaust chamber becomes a desired pressure.

The vacuum exhaust apparatus 10 includes a vacuum pump 1, which exhausts the process gas introduced in the exhaust chamber 4, a valve 2, which is located between an outlet port (not shown) of the exhaust chamber 4 and an inlet port 11a (FIG. 2) of the vacuum pump 1 to open and close the gas flow passage, and a controller 3 for performing control such that the pressure in the exhaust chamber 4 matches a target value.

Figure 2:
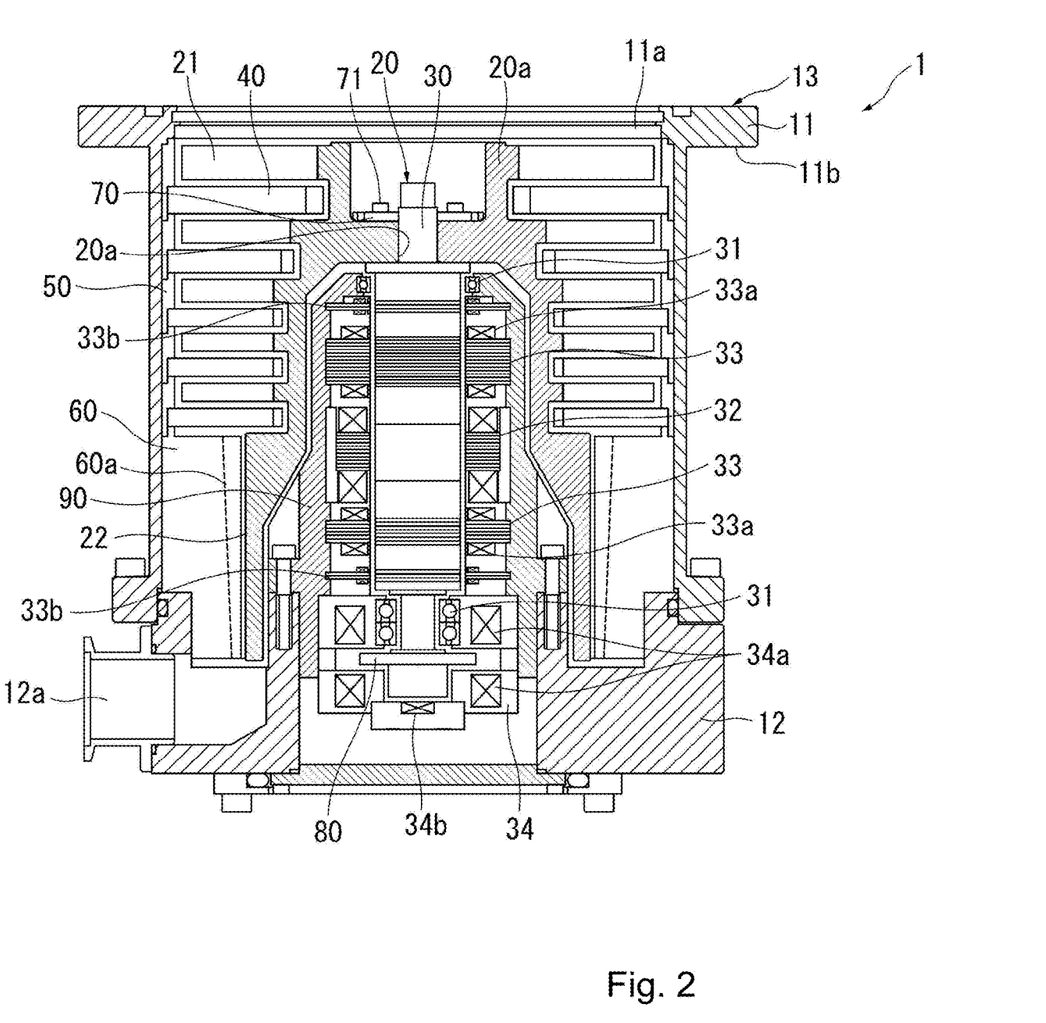
FIG. 2 is a vertical cross-sectional view showing the configuration of a vacuum pump of the vacuum exhaust apparatus of the example of the present disclosure.

As shown in FIG. 2, the vacuum pump 1, which is a turbomolecular pump, includes an outer cylinder portion 11, a base portion 12 fixed to the outer cylinder portion 11, and a rotor 20, which is rotatably housed in a casing 13 formed by the outer cylinder portion 11 and the base portion 12. The upper side as viewed in FIG. 2 of the outer cylinder portion 11 is opened to form a gas inlet port 11a, and a gas outlet port 12a is formed in the side surface of the base portion 12. The outer cylinder portion 11 has a flange 11b at the side including the inlet port 11a, and the lower end surface of a valve main body 2a (FIG. 6) of the valve 2 is fixed to this flange 11b.

The rotor 20 has a rotor main body 20a, a rotating shaft 30, and a washer 70. The rotating shaft 30 is rotatably supported in the casing 13 to rotate the rotor 20. A plurality of rotor blades 21 inclined at a predetermined angle is integrally formed on the outer circumferential surface of an upper part, as viewed in FIG. 2, of the rotor main body 20a. The rotor blades 21 are arranged radially with respect to the axis of the rotating shaft 30 of the rotor 20 and in multiple stages in the axial direction of the rotating shaft 30 of the rotor 20. Stator blades 40 are located between the stages of the rotor blades 21. The rotor blades 21 and the stator blades 40 alternate in the axial direction of the rotating shaft 30 of the rotor 20. The plurality of stator blades 40 is also inclined at a predetermined angle. The outer circumference ends of the stator blades 40 are held between multiple ring-shaped stator blade spacers 50 arranged in stages in the outer cylinder portion 11, so that the stator blades 40 are arranged radially and in multiple stages between the rotor blades 21.

A threaded spacer 60 is provided between the base portion 12 and the stator blade spacer 50 that is the closest to the downstream side. The threaded spacer 60 is cylindrical and has a spiral thread groove 60a in its inner circumference surface. A cylindrical portion 22 is formed under the rotor main body 20a as viewed in FIG. 2 (on the downstream side in the gas flow direction) and about the axis of the rotating shaft 30. The outer circumferential surface of the cylindrical portion 22 is adjacent to and faces the inner circumference surface including the thread groove 60a of the threaded spacer 60. The space defined by the outer circumferential surface of the cylindrical portion 22 and the thread groove 60a of the threaded spacer 60 communicates with the outlet port 12a.

The disc-shaped washer 70 is formed about the axis of the rotating shaft 30. Bolts 71 are fastened to the rotating shaft 30 through the rotor main body 20a and the washer 70, fixing the rotor main body 20a and the washer 70 to the rotating shaft 30.

In the vacuum pump 1, when the rotor 20 is rotated at high speed, the rotor blades 21 strike the gas molecules sucked through the inlet port 11a toward the downstream side. The struck gas molecules collide against the stator blades 40, which are alternately arranged, move downward, and are then struck by the rotor blades 21 of the next stage and thus moved to the downstream side. This action is sequentially repeated to the lowermost stages of the rotor blades 21 and the stator blades 40. The gas thus sent to threaded spacer 60 is guided by the thread groove 60a to the outlet port 12a and exhausted from the outlet port 12a. In this procedure, the pressure in the gas exhaust chamber 4 can be adjusted to a desired pressure by adjusting the rotational speed of the rotor 20. As shown in FIG. 1, the vacuum pump 1 has a rotational speed detector 1a for detecting the rotational speed of the rotor 20. The detection value of the rotational speed of the rotor 20 detected by the rotational speed detector 1a is output to the controller 3.

Protective bearings 31 are arranged near the upper side and the lower side as viewed in FIG. 2 (the upstream side and downstream side in the gas flow direction) of the rotating shaft 30. The protective bearings 31 prevent damage of the vacuum pump 1, which would otherwise occur if an abnormality renders radial magnetic bearings 33 or axial magnetic bearing 34, which will be described below, uncontrollable, causing the vacuum pump 1 to be in contact with and support the rotating shaft 30.

The rotating shaft 30 is driven by a brushless DC pump motor 32 to rotate. Two radial magnetic bearings 33 support the rotating shaft 30 in the radial direction, and an axial magnetic bearing 34 supports the rotating shaft 30 in the axial direction. The two radial magnetic bearings 33 are on opposite sides of the pump motor 32. The rotating shaft 30 is levitated and supported by these radial magnetic bearings 33 and the axial magnetic bearing 34.

The two radial magnetic bearings 33 each have four electromagnets 33a, which exert magnetic attraction force on the rotating shaft 30. Two of the four electromagnets 33a are located across the rotating shaft 30 on one of two coordinate axes that are perpendicular to the axis of the rotating shaft 30 and also perpendicular to each other. The other two electromagnets 33a are located on the other coordinate axis. The two radial magnetic bearings 33 each have four position sensors 33b, which may be inductance or eddy current sensors, for detecting the radial position of the rotating shaft 30. Two of the four position sensors 33b are located across the rotating shaft 30 on one of two coordinate axes that are perpendicular to the axis of the rotating shaft 30, parallel to the above-mentioned coordinate axes, and perpendicular to each other. The other two position sensors 33b are located on the other coordinate axis.

The rotating shaft 30 has a magnetic disc (hereinafter referred to as "armature disc") 80 located about the axis of the rotating shaft 30. The axial magnetic bearing 34 has two electromagnets 34a that exert magnetic attraction force on the armature disc 80. The two electromagnets 34a are on opposite sides of the armature disc 80. The axial magnetic bearing 34 has a position sensor 34b, which may be an inductance or eddy current sensor, for detecting the axial position of the rotating shaft 30. The inductance or eddy current position sensors 33b of the radial magnetic bearings 33 and the inductance or eddy current position sensor 34b of the axial magnetic bearing 34 have the same structure as an electromagnet, and their cores, on which conductor coils are wound, face the rotating shaft 30.

A stator 90 extends upright from the base portion 12 to protect the radial magnetic bearings 33, the axial magnetic bearing 34, the pump motor 32, and the like from the sucked gas.

Figure 3:
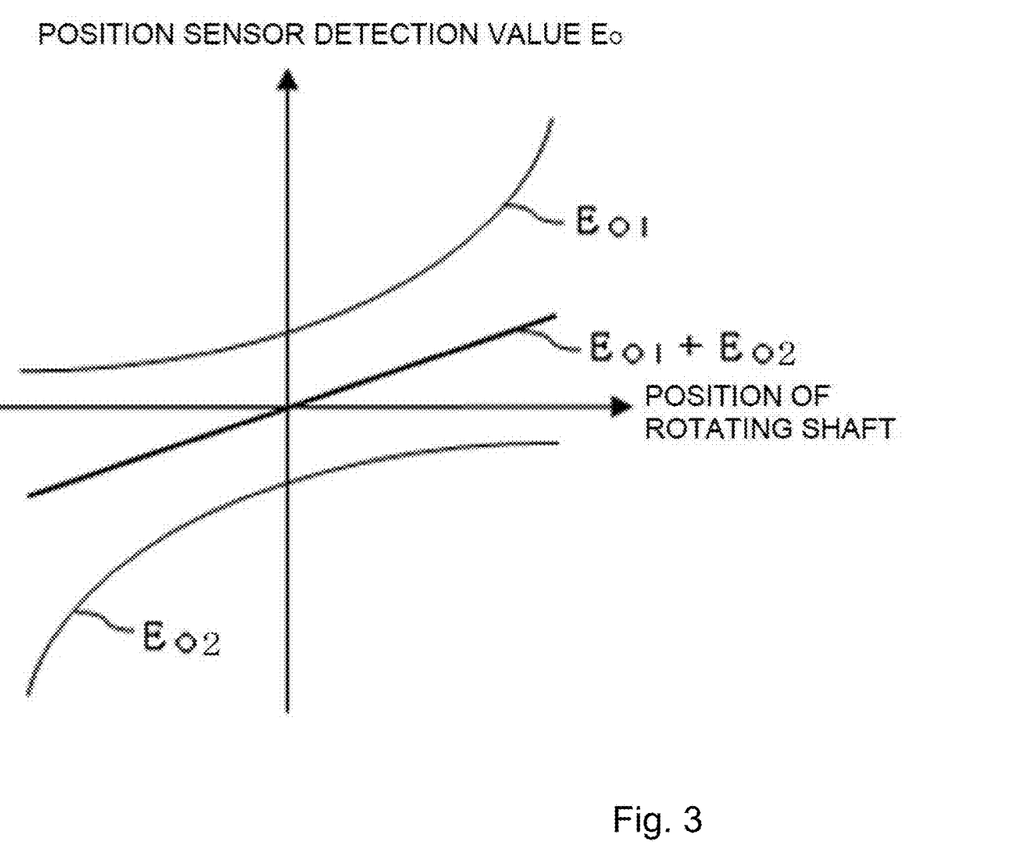
FIG. 3 is a graph showing the relationship between the position of a rotating shaft and the position sensor detection value.

The vacuum pump 1 has a pump controller (not shown), which is integral with or connected via a cable to the vacuum pump 1. The pump controller supplies power to the radial magnetic bearings 33, the axial magnetic bearing 34, and the pump motor 32 and transmits and receives signals to and from the position sensors 33b and 34b. The pump controller supplies a high-frequency alternating voltage having a predetermined amplitude to the conductor coils of the position sensors 33b and 34b of the radial magnetic bearings 33 and the axial magnetic bearing 34. The inductance of the conductor coil wound around the core of each position sensor 33b, 34b varies according to the distance between the core and the rotating shaft 30. This variation in the inductance results in variation in the amplitude of the voltage applied to the conductor coil. The pump controller detects this variation in the amplitude value, thereby detecting the position of the rotating shaft 30. As shown in FIG. 3, this amplitude value (position sensor detection value $E_O$) has nonlinearity and increases or decreases in a curve according to the variation in the position of the rotating shaft 30. The sum $E_{O1}+E_{O2}$ (or the difference depending on how the positive and negative signs are set) of the amplitude values of the two position sensors 33b facing each other across the rotating shaft 30 on each of the above-mentioned coordinate axes has quasi-linearity with respect to the variation in the position of the rotating shaft 30. Thus, the pump controller calculates this sum (or difference) and uses the value as a detection signal of the position sensors 33b in order to apply the linear control theory. This allows the position of the rotating shaft 30 to be controlled based on this theory. The pump controller places the rotating shaft 30 at the target position by performing feedback control that adjusts the values of current flowing through the electromagnets 33a based on the sum (or difference) of the detection signals of the two position sensors 33b on each coordinate axis.

Figure 4:
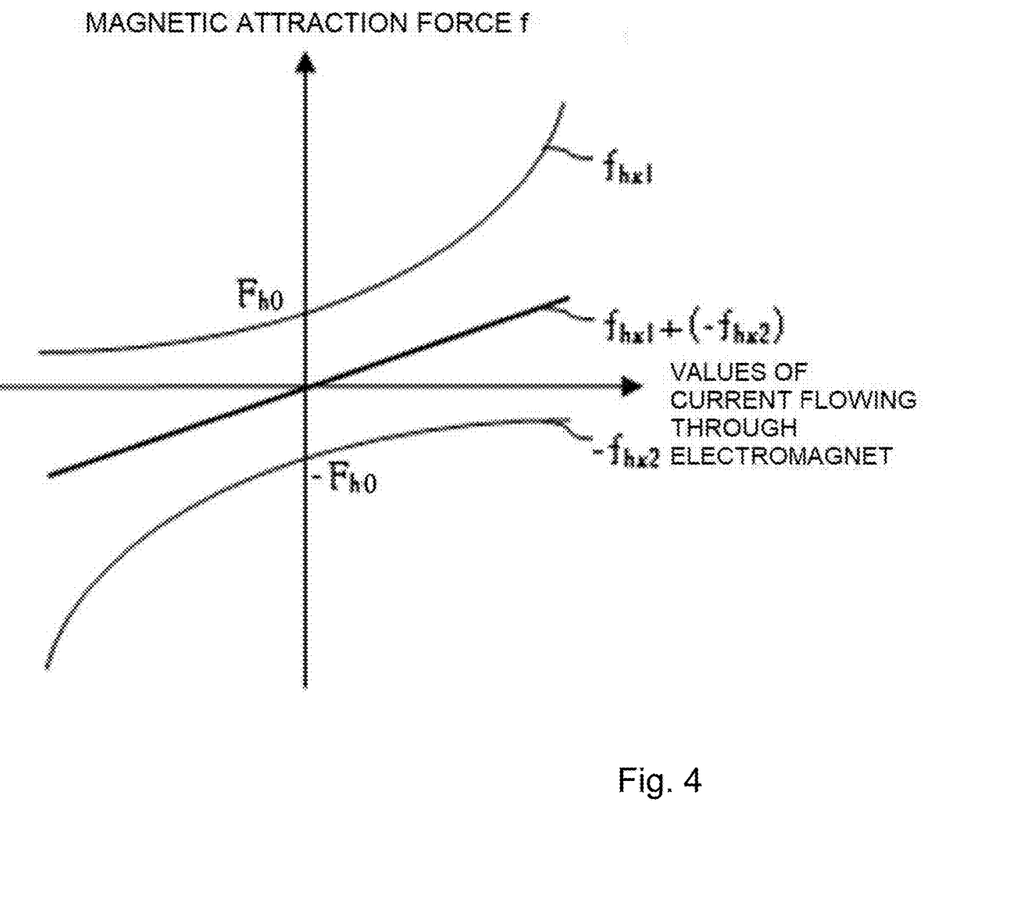
FIG. 4 is a graph showing the relationship between the value of current flowing through an electromagnet and the magnetic attraction force exerted by the electromagnet of a magnetic bearing on the rotating shaft.

As shown in FIG. 4, the magnetic attraction force f exerted by each electromagnet 33a of the radial magnetic bearings 33 on the rotating shaft 30 also has nonlinearity and increases or decreases in a curve according to the variation in the current flowing through the electromagnet 33a. As such, when the rotating shaft 30 is deviated from the target position, one of the two electromagnets 33a facing each other across the rotating shaft 30 on each coordinate axis that has a greater distance to the rotating shaft 30 receives a current of a current value $(I_0+i_1)$ obtained by adding a current value $i_1$ to a predetermined DC current value $I_0$ (hereinafter referred to as "bias current value"). The other of the two electromagnets 33a that has a smaller distance to the rotating shaft 30 receives a current of a current value $(I_0-i_1)$ obtained by subtracting the current value $i_1$ from the bias current value $I_0$. The current values are thus controlled. In this manner, the sum of the magnetic attraction forces $f_{hx1}+(-f_{hx2})$ exerted by two electromagnets 33a is used as the magnetic attraction force acting on the rotating shaft 30. Accordingly, the magnetic attraction force has quasi-linearity with respect to the variation in the current value, allowing for the application of the above-mentioned linear control theory.

The configuration of the axial magnetic bearing 34 is basically the same as the configuration of the radial magnetic bearings 33. However, for purposes such as reducing the required space, instead of arranging two position sensors on opposite sides of the armature disc 80 in the axial direction of the rotating shaft 30, only one position sensor 34b may be placed, and the other position sensor may be replaced by a coil that is placed on a circuit substrate in the controller and has a predetermined inductance. In this case, the inductance of the coil provided on the circuit substrate is a predetermined value, and the amplitude value of the alternating voltage is a predetermined value. This lowers the accuracy of the linearization of the sum (or difference) of the two position sensors with respect to the variation in the position of the rotating shaft 30. Nevertheless, this technique is useful when the vacuum pump 1 operates normally.

The bearing force for the rotor 20, which is supported and levitated by the radial magnetic bearings 33 and axial magnetic bearing 34, includes a component of force proportional to the variation in the position of the rotor 20, that is, a component corresponding to elastic force. The rotor 20 therefore has a natural frequency according to its mass or moment of inertia. The levitated rotor 20 has six degrees of freedom in total, including three degrees of freedom in the directions of the coordinate axes of a three-dimensional rectangular coordinate system having one coordinate axis (hereinafter referred to as "z-axis") aligned with the axis of the rotating shaft 30, and three degrees of freedom about these axes. The angle of rotation of the degree of freedom about the z-axis is controlled by the pump motor 32. The other five degrees of freedom are affected by the bearing forces of the radial magnetic bearings 33 and the axial magnetic bearing 34 and thus have natural frequencies according to the bearing forces of the radial magnetic bearings 33 and the axial magnetic bearing 34. In particular, each of the equations of motion of the rotor 20 of the two degrees of freedom about the two axes perpendicular to the z-axis and perpendicular to each other (hereinafter referred to as "x-axis" and "y-axis") includes a term that is proportional to the rotational speed about the axis of the other of these degrees of freedom (hereinafter referred to as an "interaction term"), as shown in equation (3) of the equation of motion about the x-axis and equation (4) of the equation of motion about the y-axis below. The magnitudes of these interaction terms are proportional to the rotational speed of the rotating shaft 30 rotated by the pump motor 32.

[Math. 1]

$$D_x - J\ddot{\theta}_x - C\dot{\theta}_x - G_x\theta_x - J_z\dot{\theta}_z\dot{\theta}_y = 0 \quad (3)$$

$$D_y - J\ddot{\theta}_y - C\dot{\theta}_y - G_y\theta_y + J_z\dot{\theta}_z\dot{\theta}_x = 0 \quad (4)$$

In equations (3) and (4), J is the moment of inertia about the x-axis or y-axis of the rotor 20, $J_z$ is the moment of inertia about the z-axis of the rotor 20, C is the viscous resistance coefficient about the x-axis or y-axis, $\theta_x$ is the angle of rotation of the rotor 20 about the x-axis, $\theta_y$ is the angle of rotation of the rotor 20 about the y-axis, and $\theta_z$ is the angle of rotation of the rotor 20 about the z-axis. In equation (3), $D_x$ is the disturbance moment acting about the x-axis, and $G_x$ is the spring constant of the moment about the x-axis produced by the bearing force of the radial magnetic bearings 33. In equation (4), $D_y$ is the disturbance moment acting about the y-axis, and $G_y$ is the spring constant of the moment about the y-axis produced by the bearing force of the radial magnetic bearings 33. $D_x$ and $D_y$ are caused by factors such as the imbalance of the rotor 20 and the exhaust load of the vacuum pump 1. $G_x$ and $G_y$ actually have frequency characteristics according to the control design of the radial magnetic bearings 33. Specifically, since the rotor 20 has the rotor main body 20a, the rotating shaft 30, and the washer 70 as described above, the moment of inertia $J_z$ and the moment of inertia J are the sum of the moments of inertia of the rotor main body 20a, the rotating shaft 30, and the washer 70.

Normally, an equation for obtaining the natural frequency of each degree of freedom can be derived from the equation of motion of the degree of freedom. However, as for the degrees of freedom about the x-axis and y-axis of the radial magnetic bearings 33, it is difficult to derive the equations for obtaining the natural frequencies for reasons such as the presence of the interaction terms in the equations of motion of these degrees of freedom as described above. For this reason, a conventional technique designs a specific magnetic bearing and relies on trial experiments or computer simulation using the finite element method or the like to obtain values of the natural frequencies of the specific magnetic bearing.

However, even though this technique can determine the natural frequency for each specific magnetic bearing, qualitative analyses of natural frequency, such as an analysis on how the natural frequency changes when the design value is changed, cannot be conducted. The natural frequency of a specific magnetic bearing is obtained after its design is completed, and if the design is changed for some reason, the natural frequency is obtained again after completing the design change. The design needs to be changed again in case of any problem. As a result, a significant amount of time is required to design a magnetic bearing and a turbomolecular pump.

In the present disclosure, in light of the fact that the radial magnetic bearings 33 of the vacuum pump 1, which is a turbomolecular pump, are used in a vacuum, the viscous resistance coefficient C is taken as 0, and equations (5) and (6) that give two natural frequencies $\omega_1$ and $\omega_2$ of the rotor 20 that are present about each of the x-axis and the y-axis are derived from equations (3) and (4) above. Two natural frequencies given by equations (5) and (6) are present for each of the degrees of freedom about the x-axis and y-axis.

[Math. 2]

$$\omega_1 = \sqrt{\frac{J(G_x+G_y)+J_z^2\dot{\theta}_z^2 - \sqrt{2J(G_x+G_y)J_z^2\dot{\theta}_z^2 + J_z^4\dot{\theta}_z^4}}{2J^2}} \quad (5)$$

$$\omega_2 = \sqrt{\frac{J(G_x+G_y)+J_z^2\dot{\theta}_z^2 + \sqrt{2J(G_x+G_y)J_z^2\dot{\theta}_z^2 + J_z^4\dot{\theta}_z^4}}{2J^2}} \quad (6)$$

Figure 5:
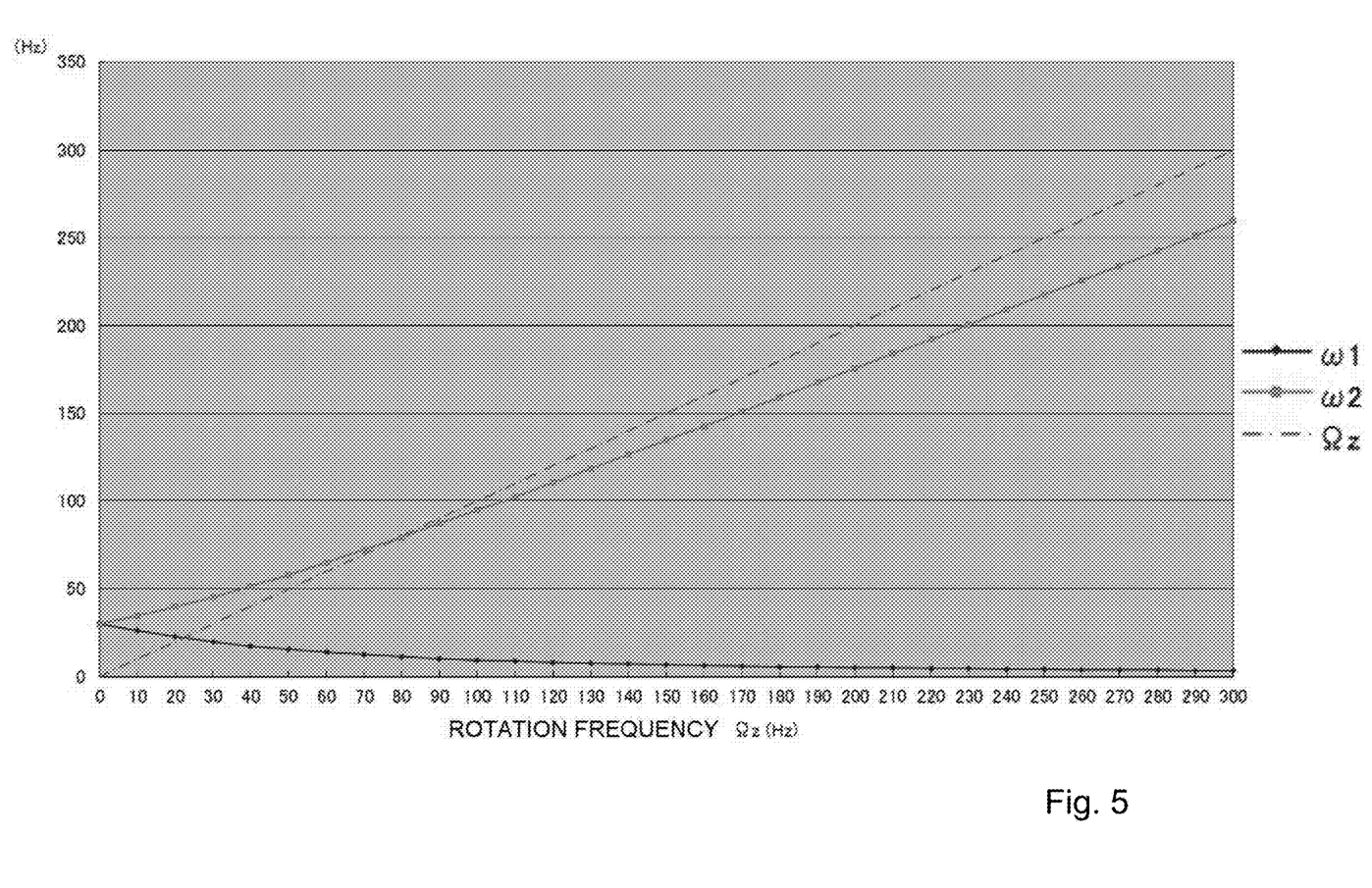
FIG. 5 is a graph showing the relationship between the rotation frequency of the rotating shaft and the natural frequency of the rotor.

As shown in FIG. 5, as the

ROTATION FREQUENCY $\Omega_z(=\dot{\theta}_z)$ increases after the rotating shaft 30 starts to rotate, the natural frequency $\omega_1$ of the rotor 20 decreases while the natural frequency $\omega_2$ increases. As the rotation frequency $\Omega_z$ increases, the natural frequency $\omega_2$ approaches the rotation frequency $\Omega_z$, matches the rotation frequency $\Omega_z$, and then departs from the rotation frequency $\Omega_z$.

When the natural frequencies $\omega_1$ and $\omega_2$ are equal or close to the rotation frequency $\Omega_z$ of the rotating shaft 30, resonance of the rotor 20 is induced, making it difficult for the radial magnetic bearings 33 and the axial magnetic bearing 34 to levitate and support the rotor 20 and also causing fatigue failure due to the continuous vibration of the rotor blades 21 and the repeated stress fluctuation. As such, the controller 3 changes the opening degree of the valve 2 when the rotational speed (rotation frequency $\Omega_z$) of the rotor 20 matches the natural frequency $\omega_1$, $\omega_2$ of displacement, or when the absolute value of the difference between the rotational speed of the rotor 20 and the natural frequency $\omega_1$, $\omega_2$ is less than or equal to a predetermined value while the pressure in the exhaust chamber 4 matches the target value, and controls the rotational speed of the rotor 20 such that the pressure in the exhaust chamber 4 matches the target value again.

Figure 6:
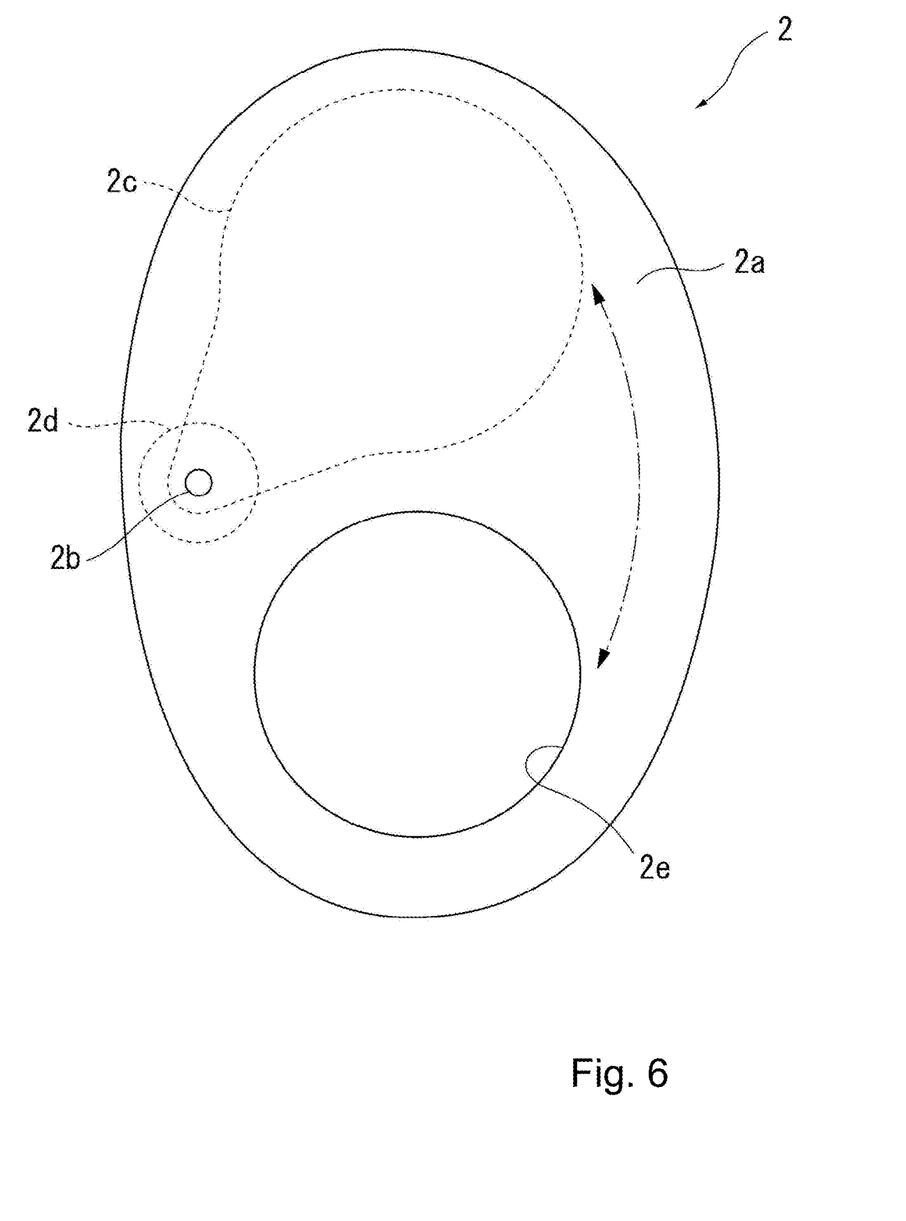
FIG. 6 is a schematic plan view showing the configuration of a valve of the vacuum exhaust apparatus according to the example of the present disclosure.

As shown in FIG. 6, the valve 2 includes a valve main body 2a, a valve body 2c fixed to a shaft 2b, a valve motor 2d that drives and rotates the shaft 2b to pivot the valve body 2c, and an opening 2e, which is opened and closed by the valve body 2c. The valve 2 is provided between the outlet port (not shown) of the exhaust chamber 4 and the inlet port 11a of the vacuum pump 1. The opening 2e of the valve 2 is connected to and communicates with the outlet port of the exhaust chamber 4 and the inlet port 11a of the vacuum pump 1.

The valve 2 uses the valve motor 2d to pivot the valve body 2c to place it at a desired position overlapping the opening 2e. The opening area of the opening 2e is thus adjusted to adjust the opening degree. By adjusting the opening degree of the valve 2, the pressure in the exhaust chamber 4 can be adjusted to a desired pressure. As shown in FIG. 1, the valve 2 has an opening degree detector 2f, such as an encoder, that detects the opening degree. The detection value of the opening degree of the valve 2 detected by the opening degree detector 2f is output to the controller 3.

The controller 3 performs control such that the pressure in the exhaust chamber 4 matches a target value by adjusting the opening degree of the valve 2 or the rotational speed of the rotor 20 of the vacuum pump 1 under predetermined conditions. The controller 3 has portions including a control portion, which may include a central processing unit (CPU) (not shown), and a storage portion, which may include a random-access memory (RAM), read-only memory (ROM), and flash memory. The storage portion stores various data such as programs to be executed by the control portion, fixed data, and detection data. The storage portion also functions as working memory for the control portion. The control portion controls the pressure in the exhaust chamber 4 by executing a program stored in the storage portion.

When the opening degree of the valve 2 is changed, a change in the opening degree results in a relatively large change in the pressure in the exhaust chamber 4. For example, when the pressure in the exhaust chamber 4 needs to be increased only minimally, even a minimal decrease in the opening degree of the valve 2 increases the pressure significantly. When the pressure needs to be lowered only minimally, even a minimal increase in the opening degree of the valve 2 reduces the pressure significantly. Furthermore, factors such as the backlash of the gear that transmits the rotation of the valve motor 2d to the valve body 2c or the elastic slippage or movement slippage of the belt may cause an error in the position of the valve body 2c moved by a rotation of the valve motor 2d. This may prevent the accurate setting of the desired opening degree. An attempt to achieve accurate control by increasing the gain of a change in the opening degree of the valve 2 with respect to a change in pressure and reducing the steady-state deviation of the pressure with respect to the desired pressure would cause, in the worst case, the oscillatory phenomenon of the opening degree of valve 2. As such, the desired pressure cannot be achieved accurately.

In contrast, when the rotational speed of the rotor 20 of the vacuum pump 1 is changed, a change in the rotational speed results in a relatively small change in the pressure in the exhaust chamber 4. Thus, when the pressure in the exhaust chamber 4 needs to be changed significantly, a significant change is required in the rotational speed of the rotor 20. However, when the vacuum pump 1 is a turbomolecular pump, the rotor 20 needs to be rotated at high speed to provide a desired exhaust performance and is thus made of a high-strength metal, such as an aluminum alloy, that resists damage when receiving a large centrifugal force. Accordingly, the rotor 20 has a large moment of inertia. It is therefore difficult to significantly change the rotational speed of the rotor 20 within a short time, or rapidly.

It may also be contemplated to use a motor capable of generating high torque as the pump motor 32 for rotating the rotor 20 to increase the acceleration/deceleration torque. However, when a brushless DC motor, which is relatively inexpensive to manufacture, is used, a greater torque constant increases the induced voltage constant. This in turn increases the counter-electromotive force during high-speed operation, which may prevent a current from flowing sufficiently to generate acceleration/deceleration torque. As a result, a significant rapid change in the rotational speed cannot be achieved. Inability to achieve a significant rapid change in the rotational speed of the rotor 20 lengthens the time required for a semiconductor manufacturing apparatus to treat wafer surfaces, for example, hindering an increase in the quantity of manufactured semiconductors.

The controller 3 solves the above problem by adjusting the opening degree of the valve 2 when the absolute value of the difference between the pressure in the exhaust chamber 4 and the target value is greater than a predetermined value, and adjusting the rotational speed of the rotor 20 of the vacuum pump 1 when the absolute value of the difference between the pressure in the exhaust chamber 4 and the target value is less than the predetermined value.

A method is now described that vacuum exhausts the exhaust chamber 4 using the controller 3 so that the pressure in the exhaust chamber 4 becomes a desired pressure. As shown in FIG. 1, a pressure gauge 5 is provided in the exhaust chamber 4, into which process gas flows, and the pressure gauge 5 measures the pressure in the exhaust chamber 4. The pressure measurement value measured by the pressure gauge 5 is output to the controller 3 and is compared with the pressure target value by the controller 3.

Figure 7:
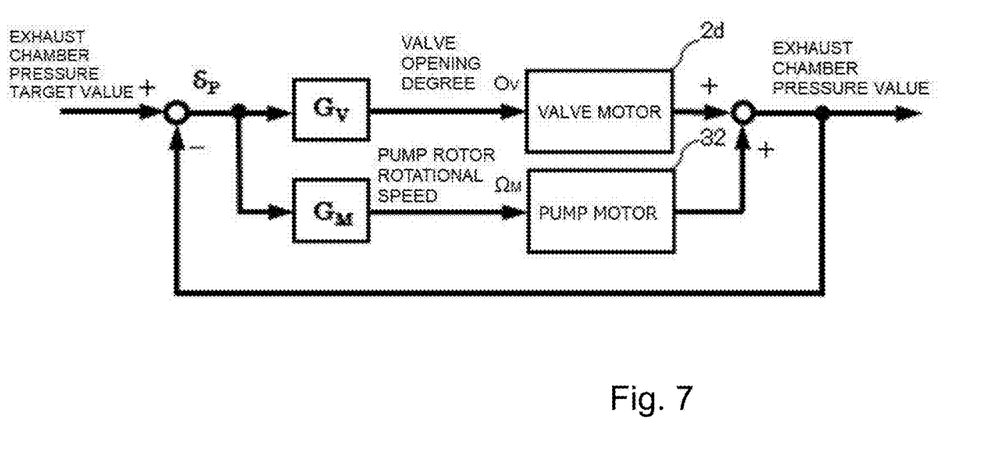
FIG. 7 is a block diagram showing a control system of a controller of the vacuum exhaust apparatus according to the example of the present disclosure.
Figure 8A:
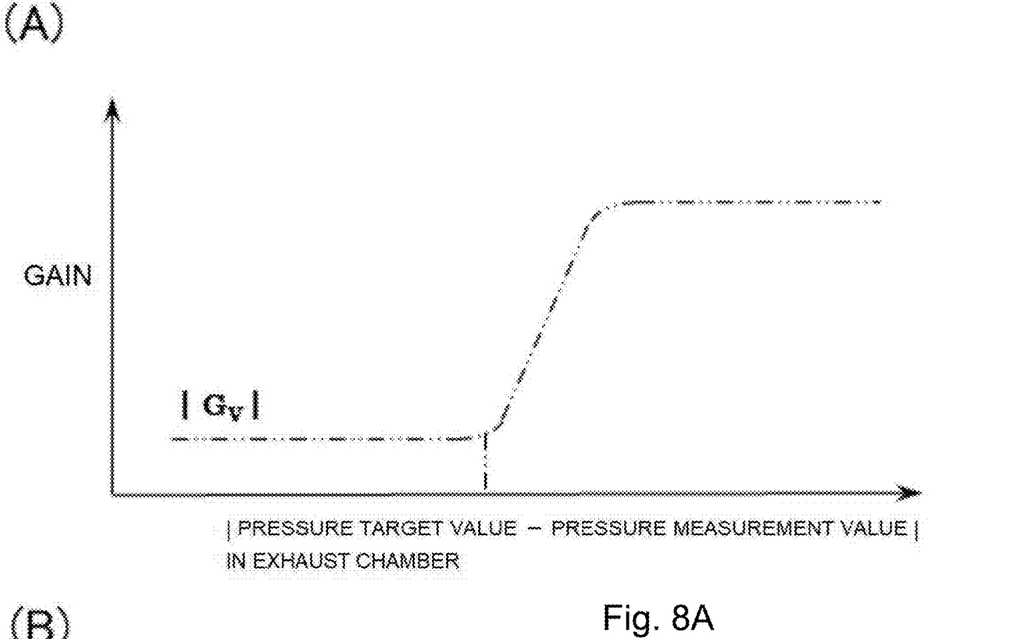
FIG. 8A is a graph showing the relationship between the absolute value of the difference between the pressure target value and the pressure measurement value and the gain of the valve opening degree.
Figure 8B:
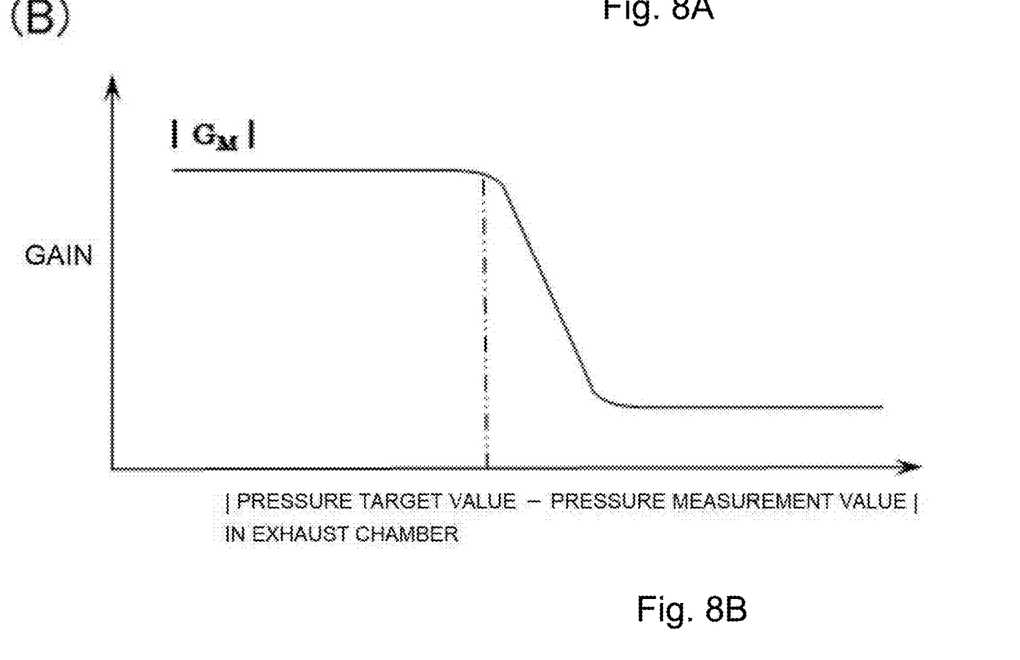
FIG. 8B is a graph showing the relationship between the absolute value of the difference between the pressure target value and the pressure measurement value and the gain of the rotational speed of the rotor.

When the absolute value of the difference between the pressure target value and the pressure measurement value is greater than a predetermined value, the controller 3 transmits a drive signal having a value corresponding to the value of difference to the valve motor 2d of the valve 2 to adjust the opening degree of the valve 2. At this time, the controller 3 may use the control system shown in FIG. 7 to increase the gain $|G_V|$ of a transfer function $G_V$ represented by equation (1) below as shown in FIG. 8A. Alternatively, the controller 3 may use the control system in FIG. 7 to reduce the gain $|G_M|$ of a transfer function $G_M$ represented by equation (2) below as shown in FIG. 8B. Additionally, the controller 3 may perform control to maintain the rotational speed of the rotor 20 detected by the rotational speed detector 1a constant.

$$G_V = O_V/\delta_P \quad (1)$$

$$G_M = \Omega_M/\delta_P \quad (2)$$

In equation (1), $O_V$ is a Laplace transform where the initial value of the opening degree of the valve 2 is 0. In equation (2), $\Omega_M$ is a Laplace transform where the initial value of the rotational speed of the rotor 20 is 0. In equations (1) and (2), $\delta_P$ is a Laplace transform where the initial value of the difference between the pressure target value and the pressure measurement value is 0.

Here, increasing the gain refers to increasing the gain by 3 dB or more with respect to the gain when the frequency is 0, that is, the direct current gain. Reducing the gain refers to reducing the gain by 3 dB or more with respect to the gain when the frequency is 0, that is, the direct current. Alternatively, increasing or reducing the gain refers to setting the average value of gains for the range of absolute values between the pressure target value and pressure measurement values that is less than a predetermined value to be greater than or less than the average value of gains for the range that is greater than the predetermined value. Alternatively, increasing or reducing the gain refers to setting the average value of gains for the range of absolute values between the pressure target value and pressure measurement values that is greater than the predetermined value to be greater than or less than the average value of gains for the range that is less than the predetermined value.

When the absolute value of the difference between the pressure target value and the pressure measurement value is smaller than the predetermined value, the controller 3 transmits a drive signal having a value corresponding to the value of difference to the pump motor 32 of the vacuum pump 1 to adjust the rotational speed of the rotor 20. In this case, the controller 3 may increase the gain $|G_M|$ of the rotational speed of the rotor 20 with respect to the absolute value of the difference between the pressure target value and the pressure measurement value. Conversely, the controller 3 may reduce the gain $|G_V|$ of the opening degree of the valve 2 with respect to the absolute value of the difference between the pressure target value and the pressure measurement value. Additionally, the controller 3 may perform control to maintain the opening degree of the valve 2 detected by the opening degree detector 2f constant. Accordingly, the pressure in the exhaust chamber 4 can be adjusted more accurately and rapidly.

A method is now described that solves the problem of induced resonance of the rotor 20 of the vacuum pump 1 described above and in which the controller 3 controls to vacuum exhaust the exhaust chamber 4 so that the pressure in the exhaust chamber 4 becomes a desired pressure. The controller 3 compares the rotational speed of the rotor 20 detected by the rotational speed detector 1a with the natural frequencies $\omega_1$ and $\omega_2$ of the rotor 20. When the rotational speed of the rotor 20 matches the natural frequency $\omega_1$, $\omega_2$ or the absolute value of the difference between the rotational speed and the natural frequency is less than or equal to a predetermined value while the pressure measurement value measured by the pressure gauge 5 matches the pressure target value, the controller 3 sends an opening degree change command signal to the valve motor 2d to change the opening degree of the valve 2 by a specific amount. Then, a drive signal having a value corresponding to the difference between the pressure target value and the pressure measurement value measured by the pressure gauge 5 is transmitted to the pump motor 32 to adjust the rotational speed of the rotor 20 so that the pressure measurement value matches the pressure target value.

According to the example, the controller 3 adjusts the opening degree of the valve 2 when the absolute value of the difference between the pressure in the exhaust chamber 4 and the target value is greater than a predetermined value, and adjusts the rotational speed of the rotor 20 of the vacuum pump 1 when the absolute value of the difference between the pressure in the exhaust chamber 4 and the target value is less than the predetermined value. As a result, the problem caused by changing the opening degree of the valve 2 and the problem caused by changing the rotational speed of the rotor 20 are avoided, and the pressure in the exhaust chamber 4 can be accurately adjusted to a desired pressure in a short time, or rapidly.

The present disclosure is described above with reference to examples, but the present disclosure is not limited to the above examples and can be modified in various manners. For example, the above examples are examples in which the valve motor 2d pivots the valve body 2c to place it at a desired position overlapping the opening 2e, thereby adjusting the opening area of the opening 2e to adjust the opening degree. However, the mechanism of the valve is not limited to this, and the valve may have any mechanism as long as it can open and close the gas flow passage. For example, the valve 2 may be a butterfly valve or a flap valve. Also, instead of the valve motor 2d, gears, belts, or the like, a valve may be used that drives the valve body 2c by means of the pressurized air generated by a compressor or the like.

According to the present disclosure, the method for controlling the pressure in the exhaust chamber 4 is changed depending on whether the absolute value of the difference between the pressure target value and the pressure measurement value is greater or less than the predetermined value. This predetermined value is appropriately selected according to factors including the type of the vacuum apparatus D, such as a semiconductor manufacturing apparatus, an electronic microscope, a surface analyzer, or a micromachining apparatus, that uses the vacuum exhaust apparatus 10, the condition and situation in which the vacuum exhaust apparatus 10 is used, and the mechanisms and types of the vacuum pump 1 and the valve 2.

Furthermore, this predetermined value may be appropriately changed while the rotor 20 is rotated according to the opening degree of the valve 2, the type and amount of process gas introduced into the exhaust chamber 4 and exhausted by the vacuum pump 1, and the like. In this case, the storage portion of the controller 3 may store a plurality of predetermined values, and the predetermined value may be appropriately changed to a value selected or calculated from these values.

What is claimed is:

1. A vacuum exhaust apparatus comprising:
    a vacuum pump including a rotor configured to rotate to exhaust an exhaust chamber, and a casing having an inlet port;
    a valve located between the inlet port of the vacuum pump and an outlet port of the exhaust chamber; and
    a controller configured to perform control such that a pressure in the exhaust chamber matches a target value, wherein the controller is configured to control the pressure by:
adjusting, responsive to a first determination that an absolute value of a difference between the target value and the pressure is greater than a predetermined value, an opening degree of the valve based on a function of the difference between the target value and the pressure, and
adjusting, responsive to a second determination that the absolute value of the difference between the target value and the pressure is less than the predetermined value, a rotational speed of the rotor based on a function of the difference between the target value and the pressure.

2. A vacuum exhaust apparatus comprising:
a vacuum pump including a rotor configured to rotate to exhaust an exhaust chamber, and a casing having an inlet port;
a valve located between the inlet port of the vacuum pump and an outlet port of the exhaust chamber; and
a controller configured to perform control such that a pressure in the exhaust chamber matches a target value, wherein
the controller is configured to control the pressure by increasing a gain of a transfer function $G_V$ represented by equation (1) and adjusting an opening degree of the valve:

$$G_V = O_V/\delta_P \tag{1}$$

when an absolute value of a difference between the target value and the pressure is greater than a predetermined value, and increasing a gain of a transfer function $G_M$ represented by equation (2) and adjusting a rotational speed of the rotor:

$$G_M = \Omega_M/\delta_P \tag{2}$$

when the absolute value of the difference is less than the predetermined value,
in equation (1), $O_V$ is a Laplace transform of the opening degree of the valve in which an initial value of the opening degree of the valve is set to 0, in equation (2), $\Omega_M$ is a Laplace transform of the rotational speed of the rotor in which an initial value of the rotational speed of the rotor is set to 0, and in equations (1) and (2), $\delta_p$ is a Laplace transform of the difference in which an initial value of the difference is set to 0.

3. The vacuum exhaust apparatus according to claim 2, wherein the controller is configured to reduce the gain of the transfer function $G_M$ when the absolute value of the difference is greater than the predetermined value, and reduce the gain of the transfer function $G_V$ when the absolute value of the difference is less than the predetermined value.

4. The vacuum exhaust apparatus according to claim 1, wherein
the vacuum pump includes a magnetic bearing configured to levitate and support the rotor, and
the controller is configured to change the opening degree of the valve when the rotational speed of the rotor matches a natural frequency of displacement of the rotor or an absolute value of a difference between the rotational speed and the natural frequency is less than or equal to a predetermined value while the pressure matches the target value, and control the rotational speed of the rotor such that the pressure matches the target value again.

5. The vacuum exhaust apparatus according to claim 1, wherein the predetermined value is changed while the rotor is rotated according to at least one of the opening degree of the valve and a type and an amount of gas that is introduced into the exhaust chamber and exhausted by the vacuum pump.

6. A vacuum pump comprising:
a controller configured to perform control such that a pressure in an exhaust chamber matches a target value;
a rotor configured to rotate to exhaust the exhaust chamber; and
a casing having an inlet port that allows a valve to be located between the inlet port and an outlet port of the exhaust chamber,
wherein the controller is configured to control the pressure by:
adjusting, responsive to a first determination that an absolute value of a difference between the target value and the pressure is greater than a predetermined value, an opening degree of the valve based on a function of the difference between the target value and the pressure, and
adjusting, responsive to a second determination that the absolute value of the difference between the target value and the pressure is less than the predetermined value, a rotational speed of the rotor based on a function of the difference between the target value and the pressure.

7. A vacuum pump comprising:
a controller configured to perform control such that a pressure in an exhaust chamber matches a target value;
a rotor configured to rotate to exhaust the exhaust chamber;
a casing having an inlet port; and
a valve located between the inlet port and an outlet port of the exhaust chamber, wherein
the controller is configured to control the pressure by increasing a gain of a transfer function $G_V$ represented by equation (1) and adjusting an opening degree of the valve:

$$G_V = O_V/\delta_P \tag{1}$$

when an absolute value of a difference between the target value and the pressure is greater than a predetermined value, and increasing a gain of a transfer function $G_M$ represented by equation (2) and adjusting a rotational speed of the rotor:

$$G_M = \Omega_M/\delta_P \tag{2}$$

when the absolute value of the difference is less than the predetermined value,
in equation (1), $O_V$ is a Laplace transform of the opening degree of the valve in which an initial value of the opening degree of the valve is set to 0, in equation (2), $\Omega_M$ is a Laplace transform of the rotational speed of the rotor in which an initial value of the rotational speed of the rotor is set to 0, and in equations (1) and (2), $\delta_p$ is a Laplace transform of the difference in which an initial value of the difference is set to 0.

8. The vacuum pump according to claim 7, wherein the controller is configured to reduce the gain of the transfer function $G_M$ when the absolute value of the difference is greater than the predetermined value, and reduce the gain of the transfer function $G_V$ when the absolute value of the difference is less than the predetermined value.

9. The vacuum pump according to claim 7, further comprising:
a magnetic bearing configured to levitate and support the rotor, wherein the controller is configured to change the opening degree of the valve when the rotational speed of the rotor matches a natural frequency of displacement of the rotor or an absolute value of a difference between the rotational speed and the natural frequency is less than or equal to a predetermined value while the pressure matches the target value, and control the rotational speed of the rotor such that the pressure matches the target value again.

10. The vacuum pump according to claim 6, wherein the predetermined value is changed while the rotor is rotated according to at least one of the opening degree of the valve and a type and an amount of gas that is introduced into the exhaust chamber and exhausted by the vacuum pump.

* * * * *